United States Patent [11] 3,586,771

[72] Inventors Gerhart Lothar Hamburger Welwyn; Joseph James Osborne, Enfield, both of, England

[21] Appl. No. 770,570
[22] Filed Oct. 25, 1968
[45] Patented June 22, 1971
[73] Assignee Sangamo Weston Limited Enfield, England

[54] SUBSCRIPTION TELEVISION AND THE LIKE SYSTEMS
15 Claims, 7 Drawing Figs.

[52] U.S. Cl. .......... 178/6.8, 178/5.1, 325/31, 325/308
[51] Int. Cl. .......... H04b 1/00, H04h 7/16
[50] Field of Search .......... 178/5.1, 6PD; 179/2AS; 325/31, 308

[56] References Cited

UNITED STATES PATENTS

| | | | |
|---|---|---|---|
| 2,947,858 | 8/1960 | Abbott | 325/31 |
| 3,119,558 | 1/1964 | Kinross | 178/6 |
| 3,281,695 | 10/1966 | Bass | 325/31 |
| 3,396,232 | 8/1968 | Hendrickson | 178/5.1 |
| 3,399,271 | 8/1968 | Butcher | 178/6 |

*Primary Examiner*—Terrell W. Fears
*Assistant Examiner*—Howard W. Britton
*Attorney*—Young and Thompson

ABSTRACT: A subscription television or radio signal distribution system in which program signals are supplied over a wire conductor network from a master station to a plurality of subscribers along with periodic price signals for controlling the monetary charge to be levied for any particular program and in which means are also provided for measuring and registering the number of active subscribers accepting any program, the said program signals being supplied through a number of slave stations which each deal with a different group of subscribers and in which each slave station performs, at regular repeated intervals, a predetermined program of operations connected with the measurement of the number of active subscribers and the transmission of resultant data signals to a common recording point under the control of a timing clock which is individual to the particular slave station and which is caused to start a fresh timing cycle in response to a command signal from the master station.

Figure 1:
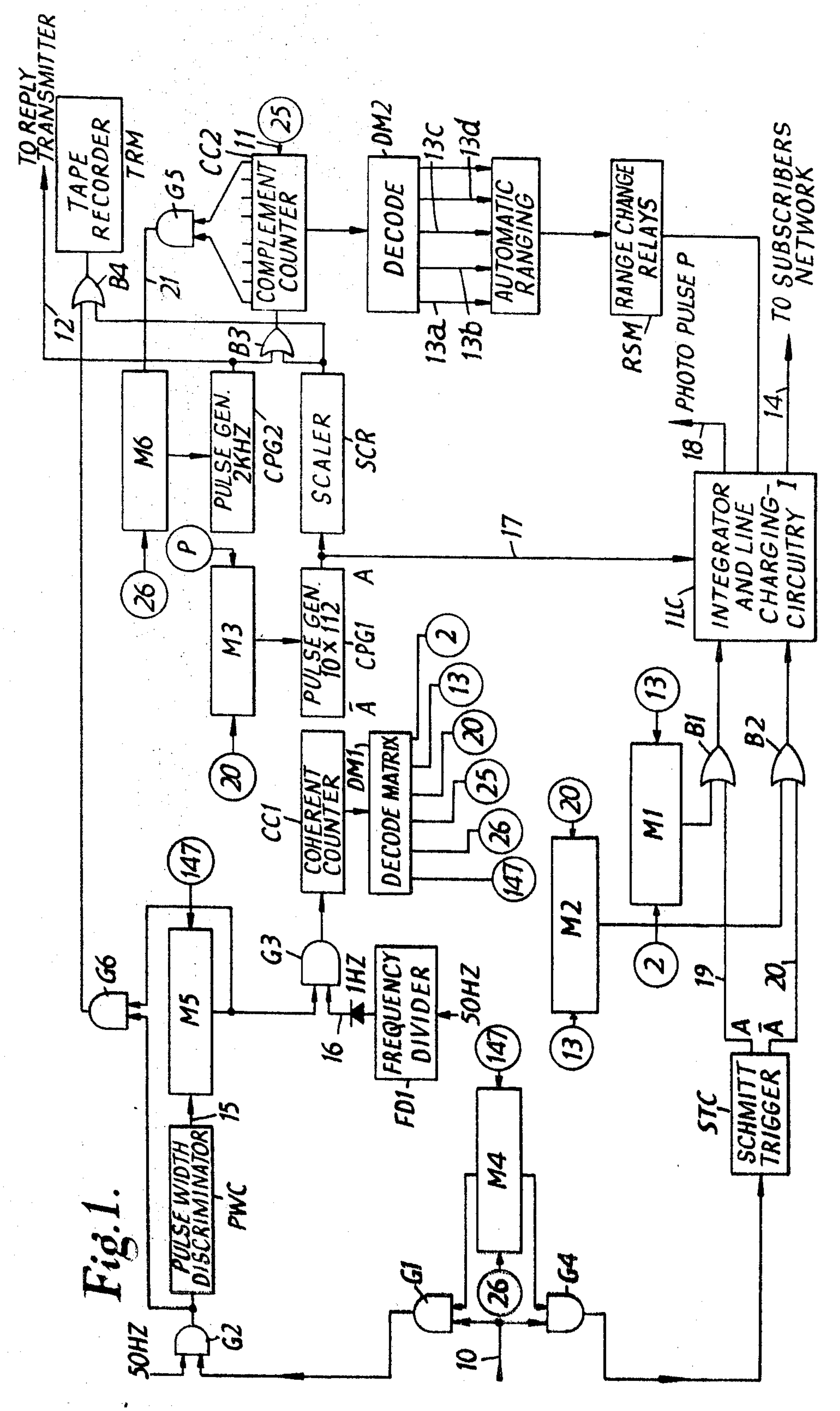

INVENTORS
GERHART LOTHAR HAMBURGER
JOSEPH JAMES OSBORNE
BY Young & Thompson
ATTYS.

SUBSCRIPTION TELEVISION AND THE LIKE SYSTEMS

This invention relates to subscription television or radio signal distribution systems in which each of a plurality of subscribers is supplied with television or radio program signals by means of a common wire conductor network and in which each subscriber is provided with metering means arranged to be advanced, while the subscriber is accepting program signals, at a rate which is related to the monetary charge to be levied for the particular program being received and which is determined by the form of a price-controlling signal sent at regular intervals to each subscriber along with the program signals. The invention is more particularly concerned with such systems which also provide for the determination, at regularly repeated intervals, of the number of active subscribers, i.e., subscribers who are accepting signals at that time, and the transmission of the resultant data information to a common recording point. The invention has particular, although not necessarily exclusive, application to systems and apparatus of the kind described in prior U.S. Pat. Nos. 3,263,787, 3,370,229 and 369,990.

The number or spacial distribution of subscribers which can conveniently be accommodated on a common wire conductor network supplied by one supply station is limited and it frequently becomes necessary to employ a plurality of sub- or slave stations located at spaced strategic positions and each supplying a different group of subscribers located in the vicinity thereof with signals originating from a single master station. While facilitating the supply of signals to the subscribers, the use of such sub- or slave stations introduces difficulty and complication in the measurement of the number of active subscribers and the transmission of the aforesaid data signals back to the common recording point and the proper utilization of such signals at such common point.

One object of the present invention is to provide an improved form of slave or substation which facilitates the production of the required information signals and the transmission of such signals to the common or master station.

In accordance with this aspect of the invention each slave or substation is arranged to perform, at regularly repeated intervals, a predetermined program of operations connected with the measurement of the number of active subscribers and the transmission of the resultant data signals to the common recording point, e.g. at the master station under the control of its own individual timing clock which is caused to start a fresh timing cycle in response to a command signal from the master station. Preferably, having completed its timing cycle, the clock ceases effective operation and awaits the next command signal.

Preferably the respective clocks of the plurality of slave stations are operated by means of signals derived from a common, controlled frequency, source such as the 50 c.p.s. public supply mains but individual stable frequency sources, such as stabilized oscillators, may be employed on account of the frequency of resynchronization.

In order to pass the various, separately computed, audience measurement signals from the plurality of slave stations to the single master station with identification of the originating slave station, the various slave station programs are arranged so that each slave station reports in turn to the master station within its own allotted reporting time interval.

Another object of the invention is to improve the accuracy of measurement of the number of active subscribers, particularly when such number is only a relatively small proportion of the total number connected to any one slave station.

Broadly in accordance with this aspect of the invention the integrating arrangement employed to assess the number of active subscribers includes means for altering its sensitivity so that the maximum permissible operational excursion thereof is achieved with a range of different numbers of active subscribers and such sensitivity adjusting means is arranged to be controlled automatically in accordance with the number of active subscribers measured during a preceding, preferably the immediately preceding, measurement period.

Further aspects of the invention relate to improved arrangements for reducing the ill effects of "noise" and other spurious or interfering signals and to arrangements for obtaining a suitable permanent or semipermanent record of the data signals at each slave station and for providing each recorded signal with identification of the programs to which they relate.

The above and other features of the invention will be more readily understood from the following description of one particular practical embodiment as applied to a subscription television relay system of the kind described in the above-mentioned U.K. patents and given by way of illustrative example only with reference to the accompanying drawing in which:

FIG. 1 is a block schematic diagram of the arrangements provided at one of a plurality of generally similar slave stations each serving its own group of subscribers by way of a wire conductor network and each controlled by a single master station.

Figures 2, 3:
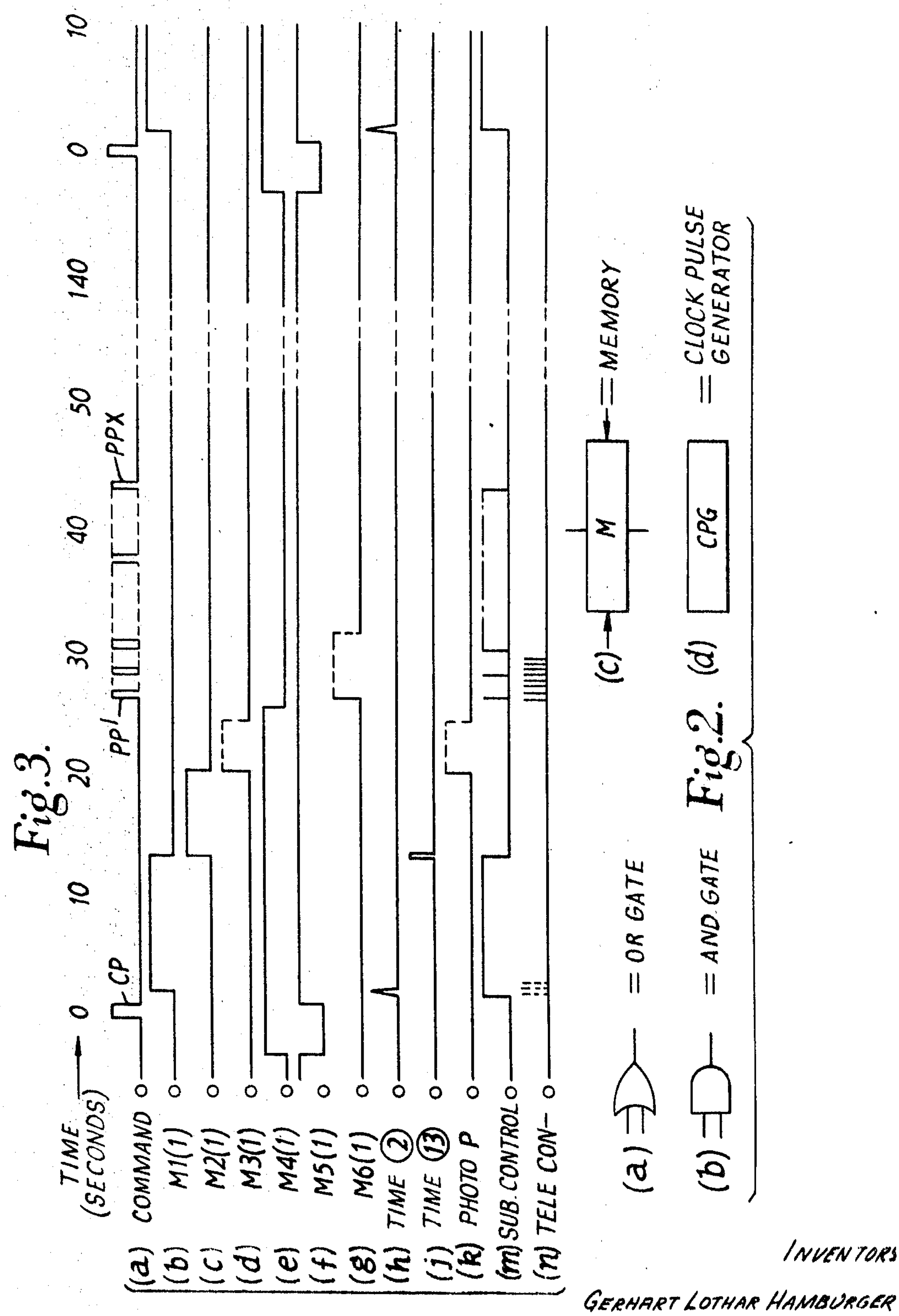

FIG. 2 comprises a group of diagrams (*a*)—(*d*) identifying the nature of certain diagram symbols used in FIG. 1, while FIG. 3 comprises a group of waveform diagrams illustrating the operation of the arrangements shown in FIG. 1.

In the signal distribution system employed with the arrangements to be described, during each 2.5 minute period of program signal distribution a DC charging pulse is applied to the network feeding the various subscribers from each slave station to cause charging of a capacitor embodied in the apparatus of each subscriber who is at the time active and simultaneously to cause operation of metering means in such subscribers apparatus by the resultant current flow. Following each charging pulse, the network and the various active subscriber's capacitors are discharged through integrating means located at each slave station, thereby the final state of such integrating means at the completion of the discharge period is representative of the total number of active subscribers being fed through each slave station. Such integrating means at each slave station is then reset to zero by the application of short DC pulses of opposite polarity and of known current/time integral value. The number of pulses necessary to zeroize the integrating means then forms a digital representation of the number of active subscribers suitable for transmission as a data signal to the indicating and/or recording means at the master station. In addition to and following each discharge period, further, relatively short duration pulses, known as price pulses, are sent out over the network to each active subscriber to effect further operation of the aforesaid metering means in the subscriber's apparatus, the number of such price pulses following each charge/discharge period being varied in accordance with the fee which is required to be levied for the program being supplied at that time. Such price pulses are conveniently derived from the master station and sent out through each slave station whilst the aforementioned digital information signals recording the number of active subscribers are being generated and transmitted to the common recording point, e.g. the same master station.

In the block schematic diagram of FIG. 1 certain symbols are employed, the nature of which will first be explained by reference to FIG. 2. Thus the symbol shown in FIG. 2 (*a*) and used as components B1, B2 in FIG. 1, denotes an OR gate or buffer circuit for combining several separate inputs to a single channel without reaction by any one input circuit upon any other. The symbol shown at FIG. 2 (*b*) and used, for example, as components G1, G2...in FIG. 1, denotes an AND or coincidence gate in which coincident signal activation of all inputs is necessary to provide any output therefrom. The symbol shown in FIG. 2 (*c*) and used, for example, as components M1, M2...in FIG. 1 denotes a memory device capable of being set into one memory state, e.g. a so-called "on" state by an applied signal on one input and of being set into an opposite memory state, e.g. an "off" state by an applied signal on another input, alternative outputs from such memory device being at an active signal level when the device is in its respective set (on) and reset (off) states. One practical form of such a memory device is a two-stable-state trigger circuit. The fourth symbol shown in FIG. 2 (*d*) and used, for example, as components CPG1, CPG2 in FIG. 1, denotes a clock pulse generator providing, when operational, a series of accurately tuned pulses at the frequency indicated.

Referring now to FIG. 1 of the drawings, 10 indicates a signal transmission channel connecting the illustrated slave station to the master station. The same channel 10 may connect all of the other slave stations to the same master station. A command signal in the form of a pulse of predetermined time duration, e.g. one second, as shown at *cp* in diagram (*a*) FIG. 3, is transmitted over this channel 10 from the master station and upon arrival passes by way of an AND gate G1, at this time opened by the "off" state output from a memory device M4 (see diagram (*e*) FIG. 3) which will be referred to later, to one input of an AND gate G2 which is continuously supplied at its other input with a 50 c.p.s. alternating or pulsating input signal. The output from gate G2, in the form of a train of 50 c.p.s. pulses, lasting for the duration of the command pulse *cp*, passes to a pulse width discriminator circuit PWC which comprises a pulse counter arranged to be reset by the leading edge of each command pulse and to provide a signal output on lead 15 only when its count state reaches 50. An output from the counter on such lead 15 is accordingly provided only when the arriving (command) pulse has a duration of 1 second or more. Such command pulse recognition output from discriminator PWC is arranged to provide a pulse which sets a memory M5 whose then active "on" output (see diagram (*f*), FIG. 3) open an AND gate G3 thereby to allow the passage of pulse signals, which are constantly available on lead 16 at 1 second intervals, to a coherent pulse counter CC1. Such once per second pulses on lead 16 are conveniently derived from the frequency-synchronized 50 c.p.s. public supply mains through a 50:1 frequency divider FD1.

The coherent counter CC1 has its various stages connected to a decoder matrix DM1 arranged to provide a series of separate, short duration, pulse outputs at differently delayed time instants following each starting of the counter by a command pulse. The timing of these time pulse signals is shown by the encircled numerals. For example, encircled "2" denoted a pulse at the time 2 seconds after the start of the initial command pulse as shown in diagram (*h*), FIG. 3, whereas encircled "13" denotes a similar pulse at time 13 seconds from the start of the initial command signal as shown in diagram (*j*), FIG. 3 and so on.

The 2-second time pulse 2 is used to set a memory device M1 whose then active "on" output (see diagram (*b*), FIG. 3) is fed through an OR gate B1 to constitute a control input to the integrator and line-charging circuitry ILC which then operates to initiate the line-charging operation in accordance with the scheme of the aforementioned earlier patents. The subsequent time pulse 13 (diagram (*j*), FIG. 3) resets the memory device M1 to stop the aforesaid charging period and, by its further application to a further memory device M2, sets the latter thereby to provide a control signal (see diagram (*c*), FIG. 3) which is fed by way of an OR gate B2 to the circuitry ILC to cause the latter to operate to start the discharge of the line through the integrator means which also forms part of the unit ILC. The output from the circuitry ILC to the subscribers network on lead 14 is shown in diagram (*m*) FIG. 3.

At the subsequent time of 20 seconds after the start of the command signal, the time pulse 20 from the decoder matrix DM1 serves to reset the memory device M2 and thereby to remove the discharge control input to unit ILC and thus terminate the line discharge period. Simultaneously a further memory device M3 is set by the same time pulse 20 to provide an output (see diagram (*d*) FIG. 3) which starts a count pulse generator CPG1 operating at a frequency of 10 kc./s. From this generator pulses are supplied over lead 17 to the unit ILC to cause resetting of the integrator means within the latter back to zero as described in the aforesaid earlier patents. The arrival of such integrator means at zero is signalled by the emission of a photopulse P from the unit ILC on lead 18. The timing of such photopulse P after the time pulse 20 is variable and is dependent upon the number of active subscribers, (see diagram (*k*) FIG. 3.).

During the period while the integrator means in unit ILC is being reset to zero, pulses from the generator CPG1 are also supplied through a controlled scaling circuit SCR and an OR gate B3 to a binary digital counter CC2. The photopulse P is arranged to reset the memory M3 and thereby to stop the pulse generator CPG1. The count state of the counter CC2 immediately after the photopulse P therefore represents the number of active subscribers. The counter CC2 has the form of a device which, by activation of a complementary control input 11, its count state at any time can be converted to its one's complement.

At time 25 seconds after the start of a command pulse, the time pulse 25 supplied to the control 11 of counter CC2 causes the latter to be complemented as referred to above. In this condition the complement counter acts as a store which can be used at a subsequent time to control the emission of a pulse train having the same number of pulses as that previously supplied thereto.

The immediately following time pulse 26 from the decoder matrix DM causes memory M4 to be set, thereby closing the AND gate G1 and by its "on" output, opening another AND gate G4 in readiness to receive price pulses over the channel 10 from the master station. These pulses vary in number in accordance with the fee to be levied and may be spread over the major part of the remainder of the 2.5 minute cycle period as described in said prior patents. A representative group of such price pulses is shown at $pp^1$,...$pp^x$ in diagram (*a*), FIG. 3. Such price pulses from the master station pass by way of gate G4 to a Schmitt trigger circuit STC whose respective "on," "off," outputs on leads 19, 20 are fed to the unit ILC through OR gates B1, B2 to control charging and discharging of the subscriber's network and thereby to form the necessary price pulses for operating the subscriber's metering means (see diagram (*m*), FIG. 3).

This start of price pulse control at, say, 26 second time is the last of the program of events which are similar in all of the different slave stations and which are controlled by the respective slave station clock systems, until the reopening of the gate G1 near the end of the 2.5 minute cycle by resetting of memory M4 by the time pulse 147 in readiness for the next command pulse (see diagram (*e*), FIG. 3). In the meantime each slave station reports back to the master station upon the result of the integration which has already been effected in the means ILC.

Such reporting back is performed by the different slave stations in turn, a period of 5 seconds being conveniently allotted to each slave station. The average length of the necessary reporting signal is of the order of only 2 seconds, whereby a margin of 3 seconds is allowed to prevent any risk of overlapping. In the present example the illustrated slave station is assumed to be the first of the series to report back, commencing at time 26 seconds from the start of the initiating command pulse. Number 2 slave station of the series will accordingly report back starting at 31 seconds, number 10 of the series at 76 seconds, and so on. To permit this the other slave stations of the series will be provided with one additional output from the decoder matrix DM1 over and above those shown in FIG. 1, such additional output being at a time corresponding to the start of the allotted reporting time for the particular station.

Referring again to FIG. 1 and considering the particular slave station 1, at the aforesaid time instant 26, memory M6 is set by the time pulse 26 to cause, by its "on" output (see diagram (*g*), FIG. 3), operation of a pulse generator CPG2 operating at 2 kc./s. The output from this generator, in the form of a stream of pulses, is supplied through the OR gate B3 to the input of the complement counter CC2 and also by way of line 12 to the transmitting means which operate to send signals from the slave to the master station via the chosen telemetry link. Diagram (*n*) FIG. 3, illustrates the form of the signal on lead 12. The complement counter CC2 is arranged to provide an output signal on lead 21 when in its "full" (all 1's) state by way of an AND gate G5 which has its respective inputs coupled to the different stages of the counter in well-known manner. Such "full" signal occurs when the number of pulses applied to the counter CC2 (after its conversion to its 1's complement state) equals the original setting of the counter under the control of the integrator in unit ILC. The resultant "full" signal on lead 21 operates to reset the memory M6 and thereby to stop the oscillator CPG2 and hence the emission of further audience data signals to the master station. During the remainder of the 2.5 minute cycle period, the other similar slave stations each operate in similar manner, each reporting back during a different 5-second time interval and each being recognizable at the master station by their particular timing within the cycle period.

At time 147 seconds after the command pulse, the time pulse 147 from the decoder matrix DM1 again resets the memory M4 to close the gate G4 and to reopen gate G1 in readiness for the arrival of the next command signal over the channel 10 at the start of the next 2.5 minute cycle, thereby to cause repetition of the cycle of events already described.

In order to measure a wide range of subscriber numbers with reasonable accuracy, the integrator means within the unit ILC is provided with a plurality of different sensitivity ranges, for example, the integrator may be of the type described in U.S. Pat. No. 1,049,851, operated to its full scale deflection position either (in range 1) by 500 subscribers, (in range 2) by 1,000 subscriber, (in range 3) by 2000 subscribers or (in range 4) by 4,000 subscribers. Such sensitivity is normally controlled by providing suitable shunts across the moving coil of the integrator when this is of the type as described in such patent. During resetting of the integrator, corresponding changes are made in the current/time integral of the reset pulses to ensure that the same number of pulses are needed to reset the integrator means to zero.

With the arrangements as already described above, automatic range selection is provided. Initially, operation is commenced with the integrator sensitivity in its lowest sensitivity range, i.e. corresponding to the maximum number of subscribers. The complement counter CC2 is arranged by means of a decoder matrix DM2, appropriately connected to its different stages, to provide separate output signals on different leads 13*a*, 13*b*, 13*c*, 13*d* whenever the counter reading reaches a total equal to 80 percent of the total number of each of the different ranges. Thus from the matrix DM2 a signal may be provided on lead 13*a* when the counter setting reaches 400, or on lead 13*b* when it reaches 800 and so on, with a signal on lead 13*d* when the counter setting reaches 3,200. Such signals are used to control the automatic ranging apparatus ARA which set the sensitivity circuits of the integrator and of the associated resetting apparatus of the unit ILC. By way of example, if the number of active subscribers is, say, 50 during a given period, no output signals will be provided from the decoder matrix DM2 and the logic of the automatic ranging apparatus ARA is arranged to select the 500 subscribers' range in the range switching means RSM for use during the next following 2.5 minute cycle. If, during this cycle, the active subscriber density is increased to, say 450 subscribers, the resultant 400 signal on lead 13*a* from matrix DM2 causes the 1,000 subscriber range to be selected in the ranging apparatus ARA and switching means RSM for use during the next 2.5 minute cycle. If during such cycle, the active subscriber count is again reduced to, say, 350 subscribers, the automatic ranging apparatus ARA and the means RSM, controlled by the absence of any signal from the decoder matrix DM2, will switch the operative range back to the 500 subscriber range for the next 2.5 minute cycle, and so on.

The arrangements by which each slave station is effectively independent of the master station except during the time of the starting command pulse from the latter, materially reduces the effects of interference on the telemetry channels as do also the arrangements for determining the pulse width of the command pulse. Any spurious command pulse of less than 1 second duration will fail to cause the "full" signal to be emitted from the circuit PWC. Since the counter of this circuit is reset by the arrival of each leading edge of a command pulse, any spurious pulse amounting to less than 1 second will be ignored.

It is desirable to provide each slave station with means for making a permanent record of the measurement results and, with this object in view, the digitizing pulses provided from the scaling circuit SCR are arranged also to be fed through an OR gate B4 to a continuously running tape recorder mechanism TRM. Since the recording comprises only a series of pulse trains, each representing the number of subscribers active during each 2.5 minute cycle over a period of time, for instance, one day, some form of program identification is desirable. This is provided by making the command signals (*cp*, diagram (*a*), FIG. 3) from the master station during different program items of a recognizably different pulse length in excess of the 1-second minimum needed to operate the pulse width discriminator PWC. Thus, upon the opening of gate G2 at the commencement of each command signal, the 50 c.p.s. pulses which are in excess of those (50) required to operate the discriminator PWC and memory M5 pass through an AND gate G6, which is opened when the memory M5 is set, to the OR gate B4 for recordal in the tape record of the mechanism TRM. These signals are at a frequency (50 Hz.) different from those of the digitizing pulses (10 kHz.) and can accordingly readily be differentiated and by variation of their number, used as a program identification signal.

Various modifications may obviously be made. For example an add-subtract circuit may be used instead of the 50 c.p.s. mains input to the gate G2 and frequency divider FD1.

We claim:

1. In a subscription television or radio distribution system of the kind in which program signals are supplied by way of a wire conductor network from a master station to a plurality of separate subscribers together with periodic signals for controlling the monetary charge to be levied for each program and which includes means for measuring the number of active subscribers taking any particular program and means for registering the total number of such active subscribers at a common recording point, the provision of a plurality of slave stations each of which is located in said network between said master station and a different group of said subscribers and each of which slave stations comprises timing clock means operative to commence each predetermined timing cycle thereof in response to a command signal from said master station, signal transmitter means controlled by said timing clock means for transmitting during each timing cycle an active subscribers measurement signal to the subscribers of the group served through such slave station, response measuring means also controlled by said timing clock means for measuring during each timing cycle the total number of subscribers responsive to said active subscribers measurement signal and data signal transmitter means for transmitting during each timing cycle to said common recording point a data signal operative in said registering means to register the number of active subscribers measured by said response-measuring means.

2. A system in accordance with claim 1 in which said timing clock means comprises a pulse counter circuit connectable to a source of pulses at a constant frequency and an associated decoding matrix operative to energize each of a plurality of separate outputs at time instants which are delayed after the commencement of each timing cycle by predetermined different time intervals.

3. A system according to claim 1 in which each slave station includes a stable frequency signal source connected to operate the timing clock means of such slave station.

4. A system according to claim 1 in which said response-measuring means comprises integrating apparatus operative during each timing cycle operation period by a signal representative of the number of active subscribers during such timing cycle period, memory means for registering the number of active subscribers measured during one operation period and providing an output signal representing such measured number and means for adjusting the sensitivity of said integrating apparatus under the control of said measured number output signal to cause the maximum permissible excursion thereof during a following operation period to be related to the number of measured active subscribers during a preceding operation period.

5. A system in accordance with claim 1 in which the respective timing clock means of the respective slave stations are operative to control an operation governing the charge to be levied for any program and said active subscribers measurement signal transmitter means and said response-measuring means thereof in synchronism with one another and then to control the operation of said data signal transmitter means in a predetermined sequential order.

6. A system according to claim 5 in which the respective timing clock means of each of said slave stations is operative to control the associated data signal transmitter means to transmit its data signals within a predetermined time interval within the period between successive command signals which is unique to such slave station.

7. A system in accordance with claim 1 in which each slave station includes signal selector means for examining and selecting each command signal from among a plurality of signals in said network.

8. A system in accordance with claim 7 in which said signal selector means is responsive to the time duration or width of a single command pulse signal.

9. A system according to claim 1 in which said active subscriber's measurement signal transmitter means comprises means for supplying a prolonged DC charging current pulse to charge the network and a capacitor at each active subscriber to a chosen voltage, in which said response-measuring means comprises a current-integrating device connected to be operated by the discharge current from said charged network and said charged subscribers' capacitors and means for applying reset pulses of predetermined current/time value to said integrating device to reset it to zero, and in which said date signal transmitter means is operative to be controlled by said reset pulses of said response measuring means.

10. A system in accordance with claim 9 in which said reset pulses are operative to advance the count state of a binary counter circuit which includes means for converting its count state to the 1's complement thereof and in which said date signal transmitter means includes circuit means for applying a series of further pulses to said counter simultaneously with their supply to said common recording point, and means for inhibiting the supply of said further pulses when said counter reaches its full count state.

11. A system in accordance with claim 1 wherein all of the timing clock means associated with the different slave stations are arranged to be started in unison by a common command signal.

12. A system in accordance with claim 11 wherein the respective timing clock means of the plurality of slave stations are each operated by means of alternating electric signals derived from a common source.

13. A system according to claim 12 in which said common source is the AC public supply means.

14. A subscription television or radio distribution system which includes audience measurement means comprising integrating apparatus for periodically measuring the number of active subscribers characterized by the provision of memory means for registering the number of active subscribers measured during one operation period and providing an output signal representing such measured number and means for adjusting the sensitivity of said integrating apparatus under the control of said measured number output signal to cause the maximum permissible excursion thereof during a following operation period to be related to the number of measured active subscribers during a preceding operation period.

15. A system in accordance with claim 14 in which said preceding operation period is that immediately preceding the instant of sensitivity control.